Aug. 30, 1938. J. B. BAKER 2,128,668
DOUBLE ROW ROLLER BEARING
Filed May 13, 1937
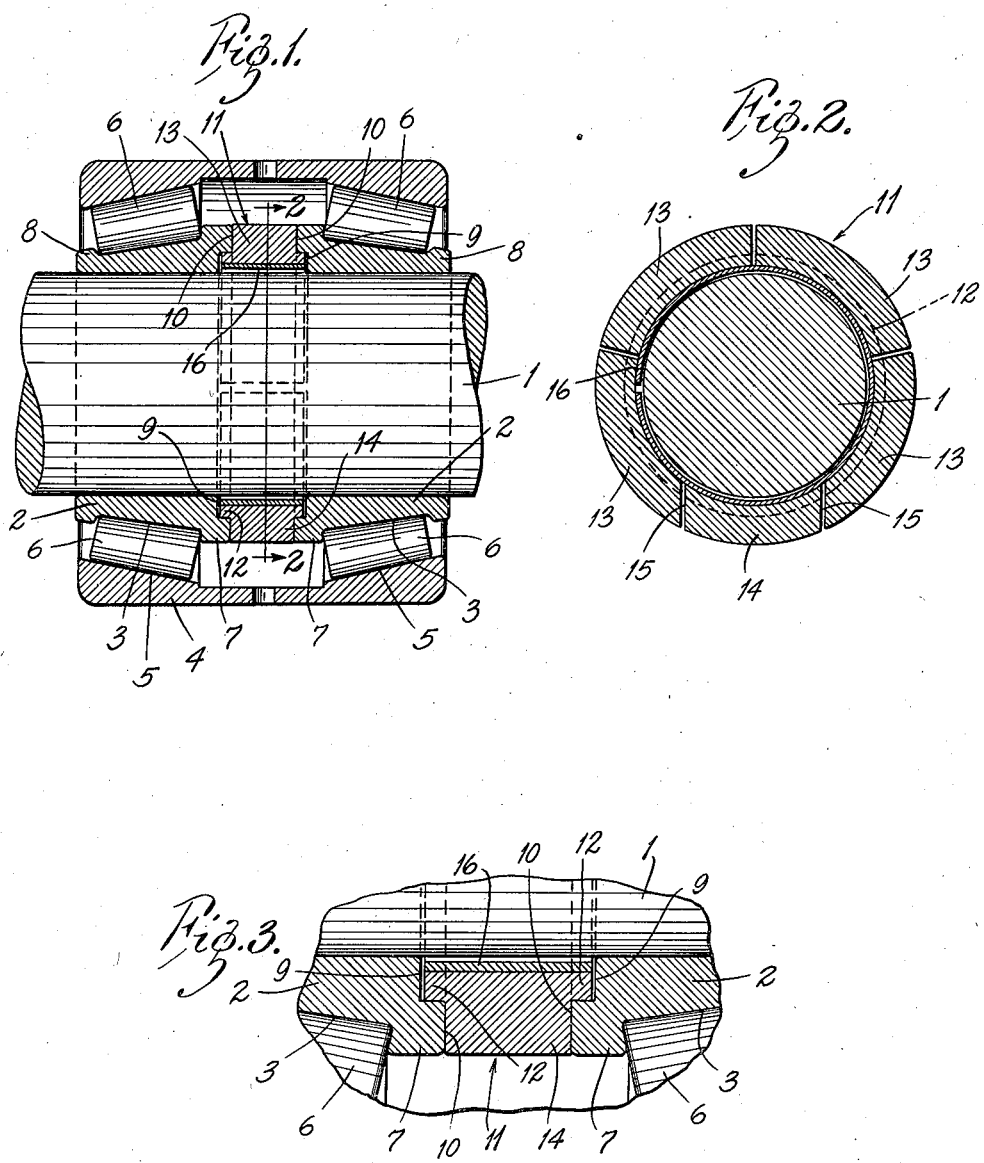
INVENTOR:
John B. Baker,
by Carter, Carr & Gravely,
HIS ATTORNEYS Patented Aug. 30, 1938

2,128,668

UNITED STATES PATENT OFFICE 2,128,668

DOUBLE ROW ROLLER BEARING

John B. Baker, Canton, Ohio, assignor to The Timken Roller Bearing Company, Canton, Ohio, a corporation of Ohio Application May 13, 1937, Serial No. 142,367

4 Claims. (Cl. 308—214)

My invention relates to double row roller bearings, particularly to double row self-contained taper roller bearings. It has for its principal objects a bearing which has an accurate preadjustment built into it, which is easily assembled and disassembled and which is capable of withstanding rough service conditions. The invention consists principally in the double row roller bearing and in the parts and combinations and arrangements of parts hereinafter described and claimed.

In the accompanying drawing,

Fig. 1 is a longitudinal sectional view of a bearing embodying my invention,

Fig. 2 is a cross-sectional view on the line 2—2 in Fig. 1; and

Fig. 3 is a partial longitudinal sectional view on an enlarged scale of the opposed end portions of the inner bearing members and the spacer member therefor.

The drawing illustrates a bearing of my invention mounted on a shaft 1. The cones 2 or inner bearing members are separate pieces, spaced apart from each other, and are positioned with their raceways 3 tapering away from each other. A double cup 4 or outer bearing member has raceways 5 tapering towards the ends thereof, each raceway being opposed to the raceway 3 of one of said cones 2. Interposed between each pair of inner raceways 3 and outer raceways 5 is a series of conical rollers 6. The cones 2 have thrust ribs 7 at the large ends of their raceways for withstanding the end thrust on the rollers and low ribs 8 at the small ends of their raceways for preventing separation of the parts.

The cones 2 have recesses 9 around the inner periphery of their end faces 10, an annular space of T-section thus being formed between the opposed end faces 10 of the two cones. Interposed between the cones 2 is a segmental spacer member, indicated generally by 11, whose body portion is of sufficient width to give the cones 2 the position required for proper running clearance between the rollers and the raceways. Said spacer member 11 has projecting ribs 12 around its inner peripheral portion, said ribs resting in the recesses 9 in the ends of the cones and thus preventing radial outward movement of the spacer member. The spacer member is composed of a plurality of segments 13, of which one segment 14 has parallel end faces 15. The several parts of the segmental spacer member are held in assembly by means of a split ring 16 disposed in the circle formed by the assembled spacer members.

In assembling the bearing, one series of rollers is placed at one end of the cup and the cone therefor is inserted from the opposite end of the cup. The second cone is then inserted and positioned back to back against the first cone, in which position the second set of rollers may be assembled over the small end rib of the cone, after which the second cone and its rollers are moved into running position. The parts of the segmental spacer member 11 are then inserted through a cone bore and into the space between cones, assembly of the last segment 14 being permitted by its having parallel end faces 15. The spring clip 16 is then snapped into place, making a self-contained bearing with a built-in preadjustment obtained by grinding the segmental spacer member to the proper width. Preferably the bore of the assembled spacer member is sufficiently larger than the cone bore to permit the spring clip 16 to be entirely clear of the shaft 1 on which the bearing is mounted.

The above described bearing has all the advantages of previous double row self-contained cageless taper roller bearings and special advantages in addition. The spacer member is of strong and durable construction, thereby eliminating the weakness of many prior double row bearings. The bearing is easily assembled and disassembled, but is not subject to danger of accidental separation of parts.

What I claim is:

1. A double row roller bearing comprising an integral outer bearing member having two raceways, separate inner bearing members each having a raceway opposed to one of said raceways, rolling elements between the opposed raceways, a segmental spacer member between said inner bearing members and a split ring holding said spacer member in place, said inner bearing members having recesses around the inner peripheries of their opposed end faces and said spacer member having ribs extending into said recesses.

2. A double row taper roller bearing comprising a double cup whose raceways taper towards the ends of said cup, separate cones, taper rollers between the cones and the raceways of said cup, said cones having recesses around the inner periphery of their end faces, a segmental spacer member between said cones having projecting inner peripheral ribs seated in said recesses and a split ring holding said segmental spacer member in place.

3. A double row taper roller bearing comprising a double cup whose raceways taper towards the ends of said cup, separate cones, taper rollers between the cones and the raceways of said cup, said cones having recesses around the inner periphery of their end faces, a segmental spacer member between said cones having projecting inner peripheral ribs seated in said recesses, one segment having parallel sides to facilitate assembly of said spacer member, and a split ring holding said segmental spacer member in place.

4. A double row taper roller bearing comprising a double cup whose raceways taper towards the ends of said cup, separate cones, taper rollers between the cones and the raceways of said cup, said cones having recesses around the inner periphery of their end faces, a segmental spacer member between said cones having projecting inner peripheral ribs seated in said recesses and a split ring holding said segmental spacer member in place, the bore of said spacer member being larger than the bore of said cones whereby said split ring is free of the member on which said bearing is mounted.

JOHN B. BAKER.